Figure 1:
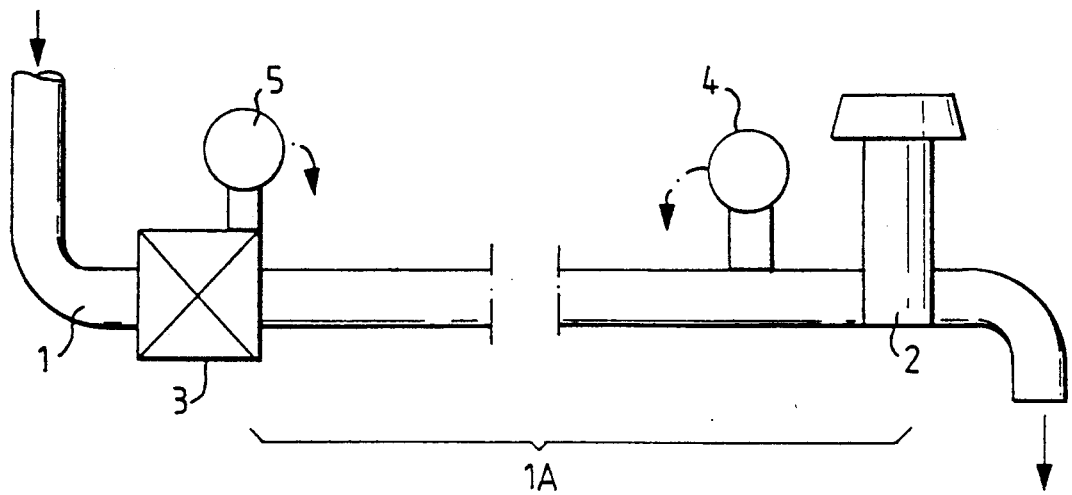

United States Patent [19]

Westerberg

[11] Patent Number: 5,014,731
[45] Date of Patent: May 14, 1991

[54] METHOD FOR PREVENTING FREEZING IN PIPES, AND A PIPING SYSTEM FOR CARRYING OUT THE METHOD

[76] Inventor: Anders Westerberg, Gnejsstigen 20, S-951 64 Luleå, Sweden

[21] Appl. No.: 399,496
[22] PCT Filed: Mar. 16, 1988
[86] PCT No.: PCT/SE88/00133
  § 371 Date: Sep. 6, 1989
  § 102(e) Date: Sep. 6, 1989
[87] PCT Pub. No.: WO88/07109
  PCT Pub. Date: Sep. 22, 1988

[30] Foreign Application Priority Data

Mar. 17, 1987 [SE] Sweden ............................ 8701098

[51] Int. Cl.$^5$ .............................................. E03B 7/10
[52] U.S. Cl. ...................... 137/59; 137/512; 137/514; 138/32
[58] Field of Search ........... 137/59, 60, 61, 62, 137/512, 514, 364; 138/27, 32

[56] References Cited

U.S. PATENT DOCUMENTS

| | | | |
|---|---|---|---|
| 1,159,225 | 11/1915 | Howell | 138/27 |
| 3,319,657 | 5/1967 | Nyiri | 137/59 X |
| 3,926,051 | 12/1975 | Katzman | 138/32 X |
| 4,117,856 | 10/1978 | Carlson | 137/62 |
| 4,483,361 | 11/1984 | Jungbert, Sr. | 137/512 X |
| 4,665,941 | 5/1987 | Hudson | 137/364 |
| 4,776,362 | 10/1988 | Domingue, Sr. et al. | 137/59 |

OTHER PUBLICATIONS

*Plumbing Design and Installation Details*, J. F. Mueller, McGraw-Hill Book Company, pp. 38 and 39, date unknown.
*Piping Handbook*, R. C. King, McGraw-Hill Book Company, pp. 23-14 through 23-16, date unknown.
*Step by Step Guide book on Home Plumbing*, date unknown.

*Primary Examiner*—John Rivell
*Attorney, Agent, or Firm*—Young & Thompson

[57] ABSTRACT

According to a method of preventing freezing in water piping there is arranged a non-return valve (3) upstream of the portion (1A) of the piping (1) which is to be protected, and a safety valve (4) downstream of this portion. The safety valve opens to allow the water to flow out and prevent freezing at a pressure increase of the water entrapped downstream of the non-return valve, the pressure increase occurring when the temperature falls from +4° C. towards the freezing point. The invention also relates to a piping system for carrying out the method.

4 Claims, 4 Drawing Sheets

METHOD FOR PREVENTING FREEZING IN PIPES, AND A PIPING SYSTEM FOR CARRYING OUT THE METHOD

The present invention relates to a method of preventing freezing in pipes for carrying water. The invention also relates to a piping system for carrying out the method in accordance with the preamble to the accompanying claim 2.

Freezing in water carrying piping is a very great problem in all countries with a cold winter climate. Apart from the immediate problem of being without water, pipe damage and subsequent water damage on thawing cost enormous amounts every year. Since the previous century, much thought and effort have been put into finding a reliable and practicably executable solution to this problem.

The proposals to solutions which have been made during the course of the years can be divided into two different main categories:
 (1) attempting to keep the temperature of the water in the pipe above freezing point,
 (2) keeping the water moving.

Attempts in accordance with the first category have included different ways of insulating the pipes. All these have increased material and installation costs. Neither has it always been possible to insulate the entire piping system, due to wall lead-throughs, couplings, disposition under ground, etc. Insulation has not given satisfactory results even so, for reasons which will be made clear below.

Another possibility which has been tried for keeping the temperature of the water in the piping system above freezing point has been heating cable or heating tape mounted inside or outside the pipes and connected to the electricity supply. These are very difficult to install in existing piping systems and must be connected to the electricity supply, and thus stop functioning if there is failure in the electricity supply There is also a risk of over-heating the water, which leads to deteriorated drinking water quality. For controlled heating, temperature measurement and regulation must take place along the entire extent of the piping system.

Attempts according to the second category, i.e. keeping the water moving continuously or periodically, have also been many during the years. An old, well-tried method is to keep a water tap open during the winter. This has the disadvantage of increasing water consumption considerably. It is difficult to set the tap open sufficiently to be sure that the water does not freeze. There can also be problems with freezing in the drain with continuous minimum flushing. Attempts have also been made to connect a timing clock to the tap, e.g. for opening it every other hour round the clock. The programmed opening and closing of the tap is dependent on electric current and must be set to take into account the freezing risks pertaining to each building. The problems with water consumption and ice formation in the drain remain, although to a lesser extent. Storage tanks have also been used as a kind of water clock for periodic flushing. These have the above-mentioned disadvantages, but function during an electricity failure, although in addition they have a voluminous water tank which is difficult to adjust.

There have also been investigated different proposals for forced circulation without tapping, inter alia systems for blocks of buildings requiring a common circulation pump and relaying of the service piping with duplicating of the pipes to and from each building, and in the building if these pipes are also to be protected. This solution is however expensive and complicated and not executable in an existing water piping system.

Extensive attempts with temperature-regulated tapping have given poor results, since the temperature in the piping system can vary heavily at different places. Placing the temperature indicators and selection of sensitivity will thus be very difficult. They are also dependent on functioning electronics.

Different attempts have also been made during the course of the years to design a valve for water piping which guards against freezing damage. For example, a waste valve is known from SE-C 210 736 with an upper chamber filled with water, which is assumed to freeze before the water in the piping freezes. The expansion on the formation of ice in the upper chamber actuates a waste valve causing it to open and allow the water in the piping to flow out. The uncertainty factors in this structure are several, e.g. the assumption that freezing will first take place in the upper chamber and that the water flowing out from the opened valve will melt the ice in the upper chamber and allow the valve to return to its closed position. This valve has thus not been used to any great extent.

The U.S. application Ser. No. 641,308 teaches a tap with a temperature-sensitive element in the tap which opens the tap at low temperatures. This solution has the great disadvantage that the temperature is only measured at the tap. The same principle with a temperature-sensitive element is used in the U.S. application Ser. No. 4,117,856. The SE patent specification 103 613 utilizes an adjustable, continuously open shut duct and a rubber flap which opens at a subpressure caused by ice formation in the pipe. The valve thus does not prevent ice formation in the pipe, and furthermore it requires a continuously running jet of water.

The present invention has the object of providing a method of preventing freezing in pipes and a piping system for carrying out the method which avoids the above-mentioned disadvantages. This is achieved by a method of the type described in the introduction, which has the characterizing features defined in claim 1 and by a piping system of the kind described in the introduction which has the characterizing features defined below. The solution to the problem has been achieved by using a few simple and reliable components which also function in the event of an electric current failure.

The solution according to the present invention is partly based on a discovery which is completely incompatible with the knowledge accepted up to now as to how pipe rupture during freezing occurs, and on which all the previous attempts for a satisfactory solution have been based. Trials carried out by me under controlled conditions in a research laboratory have namely shown that pipe rupture during freezing does not occur at the ice plug formed but at a part of the pipe where the water has not yet frozen. Thus, a growing ice plug can give rise to a pipe rupture at a place 100 m from it. This explains why temperature controlled frost prevention devices have not been able to solve the problem. It is not possible to measure the temperature everywhere in the water piping system. This situation has avoided discovery due to a hardly noticed property of water, namely that when the pressure rises in unfrozen water the freezing point is displaced to below 0° C. This is shown in the form of a diagram in FIG. 2. For example, when two ice plugs at a distance from each other grow towards each other the pressure increases until the pipe bursts, whereon the pressure suddenly falls and the freezing point is once again raised. The result can then be that an ice plug of hundreds of meters can be formed very rapidly. It is this that causes one to believe that the pipe is poorly insulated where the crack occurs, when in actual fact the crack occurs where the pipe is best insulated.

Figure 2:
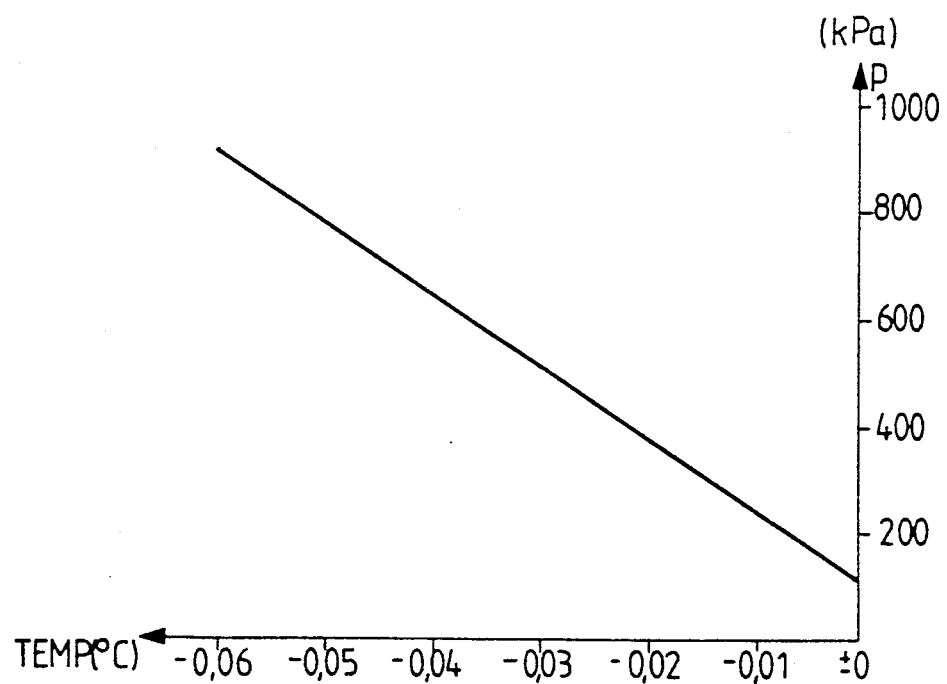
Figure 3:
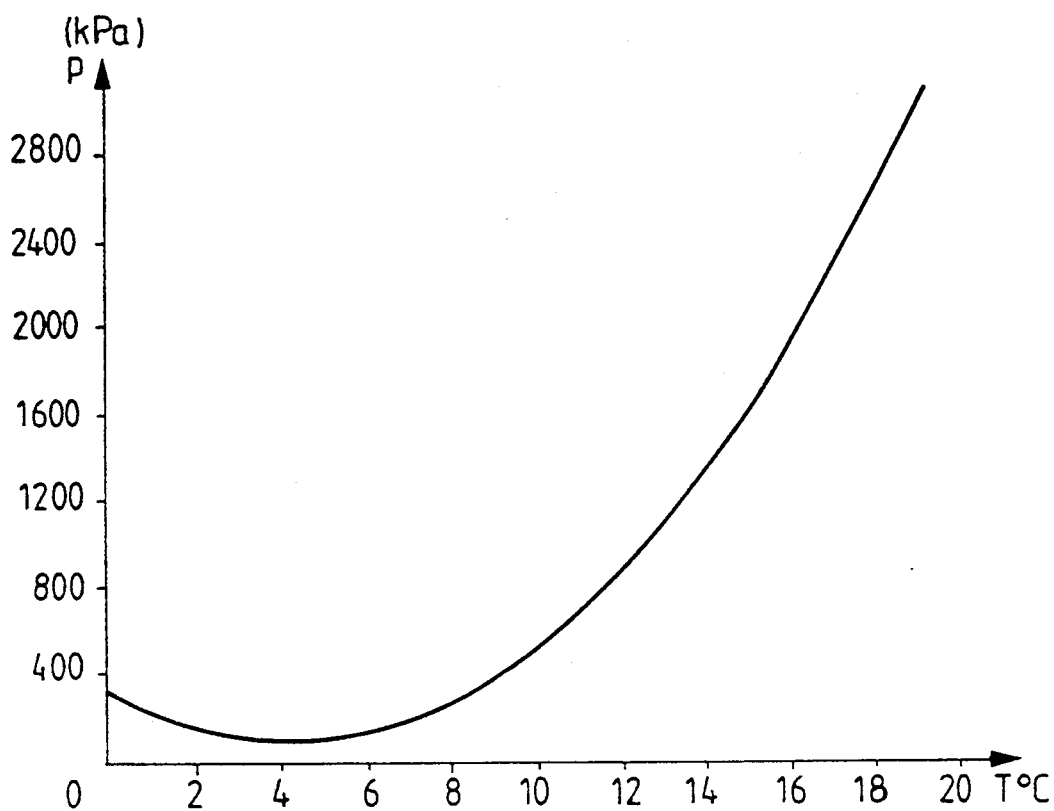
Figure 6:
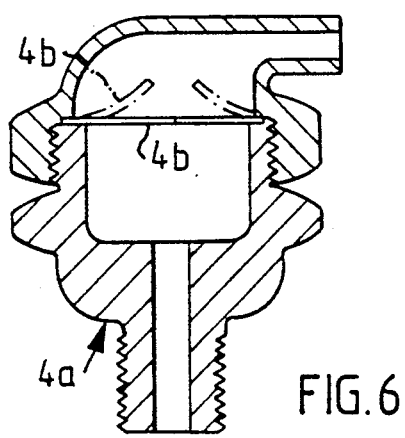
Figure 4:
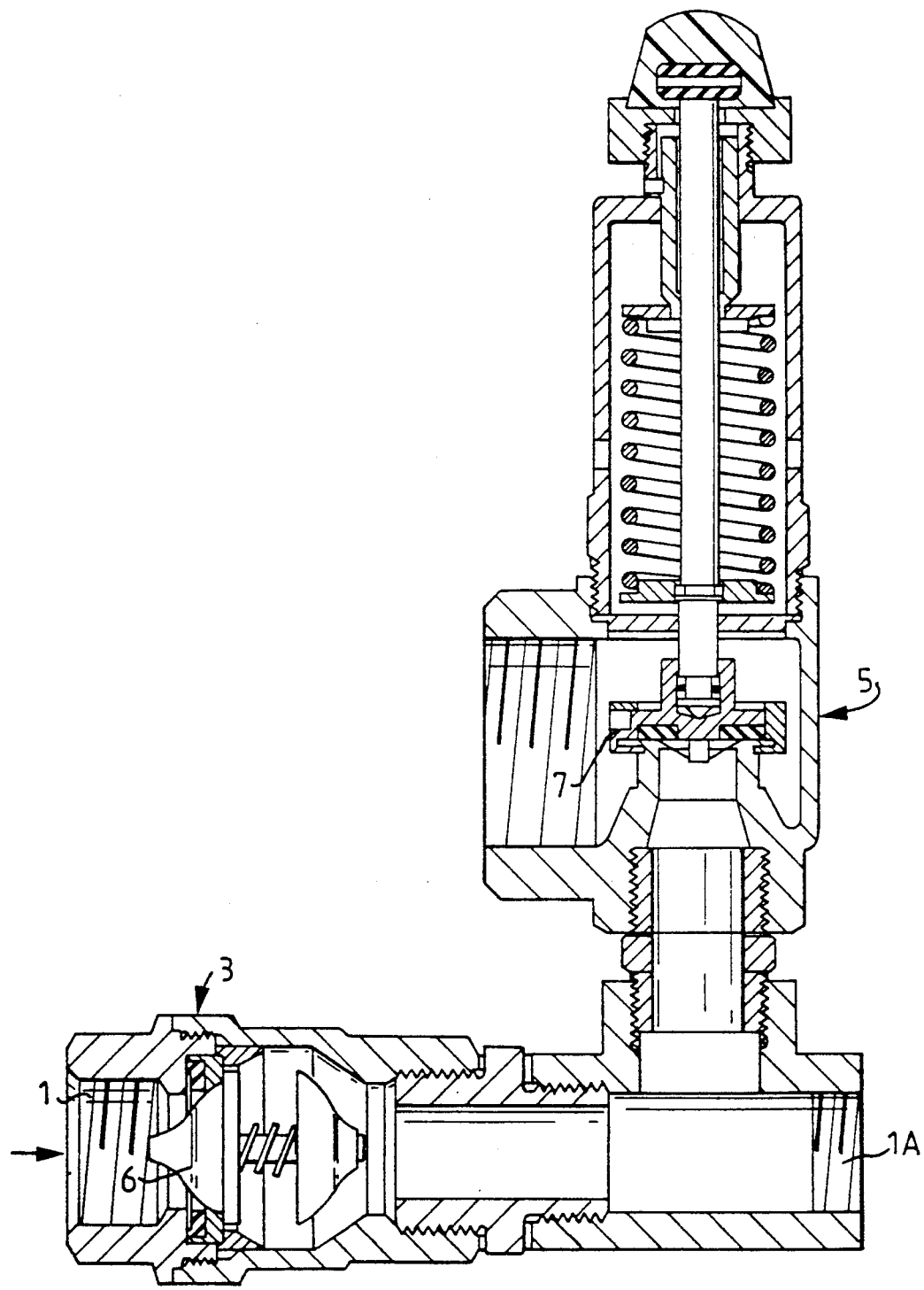
Figure 5:
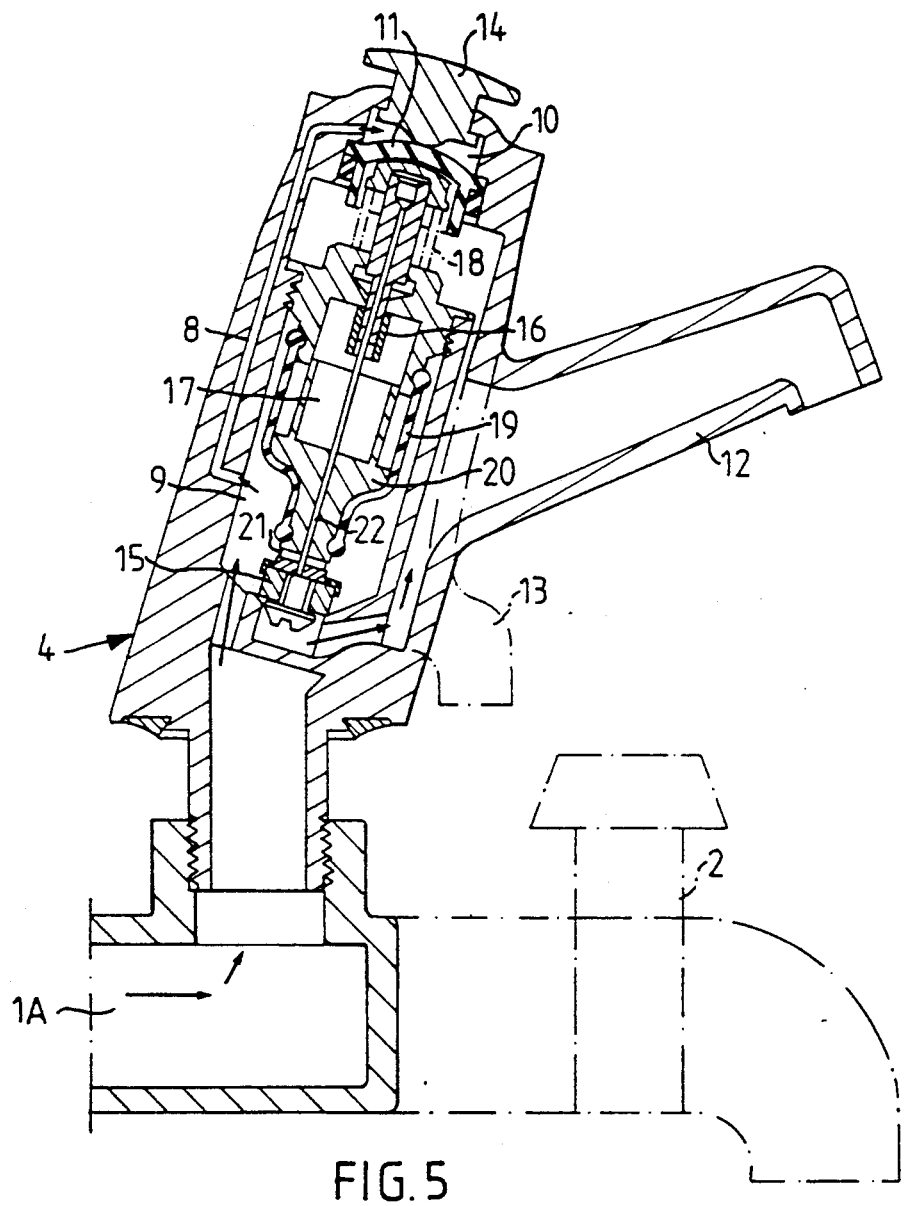

The present invention is also based on a known property of water which has not been utilized so far in this connection, i.e. that the volume of a given quantity of water decreases with falling temperature down to $+4°$ C., to subsequently increase when the temperature continues to fall from $+4°$ C. to the freezing point. This situation is illustrated in the diagram in FIG. 3 and will be explained in more detail below in conjunction with the description of an embodiment example, and with reference to the Figures on the drawings, of which FIG. 1 illustrates purely schematically water pipe of a piping system for carrying out the method in accordance with the invention, FIG. 2 is a diagram illustrating how the freezing point of water is lowered for increasing pressure, FIG. 3 is a diagram illustrating theoretically how the pressure in an entrapped quantity of water varies with the temperature, FIG. 4 shows in section a non-return valve in combination with a second safety valve, FIG. 5 shows in section a first safety valve adjacent the tap, and FIG. 6 shows a simple safety valve which opens when a rupture tab is broken due to over-pressure.

The piping system illustrated in FIG. 1 includes quite simply a pipe 1 taking water under pressure from a reservoir, water tower, pump, etc., to a tap 2. A non-return valve 3 is connected in the line and allows the water to flow in the normal flow direction from the water tower, but not at all in the opposite direction, should the pressure rise in the pipe portion 1A between the non-return valve 3 and tap 2. A safety valve 4 is mounted close to the tap 2 and in this simple way there has been achieved an effective protection against freezing in the pipe portion 1A of the piping between the non-return valve 3 and the tap 2.

The invention utilizes a property of water which has been almost unnoticed in this connection, namely that a given quantity of water assumes its least volume at a temperature of $+4°$ C. At atmospheric pressure, a kilogram of water has a volume of 1.000028 liters at $+4°$ C. and 1.000101 liters at $+1°$ C. Since water has extremely small compressibility, a temperature drop from $+4°$ C. to $+1°$ C. gives rise to a considerable pressure increase in a tightly closed space, such as the pipe length 1A, which is free from air. FIG. 3 illustrates how the pressure varies in an enclosed quantity of water with varying temperature. The change in pressure in relation to temperature can be expressed by the following formula:

$$\frac{dp}{dt} V = \frac{a}{k}$$

where V is a constant volume, $k = 48.8 \times 10^{-11}$, $a = 0$ at $4°$ C. and $a = 0.6 \times 10^{-4}$ at $0°$ C. ($a$ varies linearly therebetween).

For falling temperatures down to $+4°$ C., the pressure in the pipe portion 1A will thus also fall. But for continued lowering of the temperature in the water from $+4°$ C. down towards the freezing point for the air-free water tightly entrapped in the pipe portion 1A, the pressure will rise due to the expansion of the water. The non-return valve 3 prevents all backflow to ensure the desired pressure rise. The non-return valve 3 may for example be placed adjacent the water meter in a housing at a place where it is desired to prevent formation of ice in the piping. However, the non-return valve 3 may be mounted at any place provided that there is created a sufficient pressure rise in the pipe portion 1A between the non-return valve 3 and the safety valve 4, when the water is in the neighbourhood of its freezing point The non-return valve 3 may be adjusted to open for through-flow in the normal direction of flow not before the pressure on its upstream side exceeds the pressure on its downstream side with at least 1 kPa. Practical tests with a half-inch copper pipe closed at both ends show that the pressure in this pipe may fall from 500 kPa at 20° C. to 300 kPa at 4° C., followed by an increase to 600 kPa when the temperature approaches 0° C. There will thereafter be a pressure increase up to tens of thousands kPa before the water is changed into ice.

According to an embodiment the safety valve 4 is provided to open at about 100 kPa to reduce the pressure and at the same time letting out water during 10 to 15 seconds before the safety valve 4 closes again. This allows the water to be flushed through the non-return valve 3, into and through the pipe portion 1A. This procedure will then be repeated automatically if the water is once again subjected to the risk of freezing.

In addition, copper has a high coefficient of expansion and thus reinforces the pressure increase at temperatures below 4° C. by its internal volume decreasing. There is also an expansion of the water volume entrapped in the copper pipe at a temperature increase from $+4°$ C. and upwards. Such a temperature increase thus results in a lesser pressure increase than would be the case (which is illustrated in FIG. 3) with an absolute constant pipe volume.

This enables, in accordance with the invention, forming the safety valve at 4 the tap 2 in the form of a simple bursting tab, which bursts at the high pressures occurring when the water approaches freezing point, to allow a minor jet of water to flow until the tap has been replaced. Due to the expansion of the pipe, the pressure increase for rising temperature will not be sufficient to burst the tap (in such a case quite unnecessarily).

Practical tests with a piping system made from half-inch copper pipe in accordance with the invention have shown that for water at 4° C. and a pressure of 300 kPa the pressure increases to 600 kPa at 0° C., the pressure then increasing very rapidly to high pressures of more than 5000 kPa but still with the water in its liquid form. A safety valve should open at the rated pressure of the pipe, in this case 100 kPa for ordinary half-inch copper pipe. No ice formation takes place when the safety valve opens causing the pressure to fall and water to be let out.

The safety valve 4 close to the tap 2 should preferably have a retarded reclosure, so that it allows the water to flow for about 10-15 seconds before it closes. This allows the water to circulate and bring new, warmer water into the pipe or pipes which are to be protected. Even for very cold temperatures round the piping, there is still a rather small amount of water which flows out to waste every day. And if there is no immediate risk of freezing, no water at all will run to waste. The safety valve 4 functions as a sensor monitoring the entire piping system downstream of the non-return valve 3.

Should in spite of everything an ice plug be formed in the pipe, between the non-return valve 3 and the tap 2, bursting of non-return valve 3 or the pipe can be prevented by combining a second safety valve 5 with the non-return valve 3.

FIG. 4 shows a known non-return valve 3 in combination with a known safety valve 5 made by Valstop, Sweden, with type number H151. The non-return valve comprises a spring loaded valve member 6 opening when the pressure upstream the valve member exceeds the pressure downstream the valve member with a predetermined value.

The safety valve 5 comprises a springloaded valve member 7 which opens at a predetermined pressure at the place where the safety valve is connected to the pipe portion 1A.

FIG. 5 shows a known safety valve 4 of the type Spirax SARCO 851 T, Sweden, which is slightly modified by the provision of a water channel 8 which leads water from the pipe portion 1A through a chamber 9 to a pressure chamber 10 to press a diaphragm 11 downwardly when the pressure in the pipe portion 1A exceeds a predetermined value to open the safety valve for a predetermined period of time to let water out through the outlet 12 or the outlet 13 shown in dotted lines to indicate that this outlet may replace the ordinary outlet 12 when the pipe portion 1A is extended as shown in dotted lines and ended with the tap 2 as shown in FIG. 1.

In the standard version, a knob 14 is pushed down to press down the diaphragm. This pushing action is replaced by the pressure of the water led through the channel 8 to the pressure chamber 10.

When the valve members 15 and 16 are closed, the water pressure in chamber 9 is counteracted by the pressure of the water in the counter pressure chamber 17 and the spring 18 keeps the valve member 16 closed; whereas the valve member 15 is held by the flexible rubber sleeve 19.

When the predetermined pressure has been reached in the pipe portion 1A at its connection with the safety valve 4, and this pressure also has reached the pressure chamber 10, the valve member 16 opens to permit water to leave the chamber 17 which in turn results in that the water in chamber 9 moves the valve body 20 and opens the valve member 15 to admit water from the pipe portion 1A, through the chamber 9 and out through the outlet 12 or 13. At the same time water enters the small cross-channel 21 and flows through channel 22 to fill the chamber 17 which after a predetermined time when the pressure in the pipe portion 1A has been reduced due to flow of a certain amount of water through the outlet 12 or 13 respectively will result that the diaphragm 11 is free to move back to its starting position, the spring 18 moving the valve member 16 to its closed position to enabling pressure to build up in the chamber 17 which will enable the rubber sleeve 19 to return the valve member 15 to its closed position. The time of holding the valve 4 open after actuating the diaphragm 11 is ajustable in a known manner.

FIG. 6 shows a safety valve 4A having a rupture tab 4b which is shown in dotted line when ruptured.

The invention may be employed in any water pipe system subjected to temperatures below the water freezing point. For instance, sprinkler systems and water pipings in airplanes may advantageously be provided with the safety device according to the invention. When parking airplane in the winter, the water installation is sometimes subjected to low temperatures such as −30° C. but the freezing risk in the piping is in a simple matter eliminated by means of the invention. The water supply pipe 1 is then coming from a warm water container in the airplane which will feed warm water when the safety valve or valves 4 open.

As understood from the above the invention is simple to apply to any water pipe portion 1A which may be subjected to freezing. Upstream of this portion 1A in an area where the water supply pipe 1 is insulated or located in a non-freezing space, the non-return valve 3 is mounted, preferably together with its safety valve 5 which will function merely as an emergency under extreme conditions. Downstream the pipe portion 1A the safety valve 4 is mounted. The length of the pipe portion 1A may be some meters or up to hundred meters Normally, the safety valve 4 is mounted close to the tap 2, but the pipe length between the pipe portion 1A and the tap 2 may have a considerable length which is not subjected to the risk of freezing; the safety valve may be mounted at the end of the pipe portion 1A or at any place between this pipe portion and the tap 2. However, in most cases, for practical reasons, the safety valve 4 is provided close to the tap 2.

According to the invention, the pressure rises in the pipe portion 1A when the temperature passes +4°C. down to about zero without any formation of ice, for reasons given above. At a predetermined relatively high pressure in the pipe portion 1A, the safety valve 4 opens during a predetermed period of time. The water in the pipe portion 1A starts to flow out, the pressure is lowered to the pressure permitting the non-return valve 3 to open and relatively warm water to flow through the non-return valve, the pipe portion 1A and through the open safety valve 4, until it automatically closes at the end of the predetermined time as described in connection with the safety valve 4 in FIG. 5. Accordingly, there will repeatedly be an opening of the safety valve 4 letting out relatively small amounts of water to prevent freezing in the pipe portion 1A.

The invention has been explained here with reference to an extremely simple piping system, in order to make the principle of the invention more clear. It is, however, evident that the invention can be applied within the scope of the following claims to complicated piping systems with many branches.

I claim:

1. Method of preventing freezing in a pipe (1, 1A) for conducting water from a supply of water, comprising mounting a pressure-tight non-return valve (3) upstream of an otherwise pressure-tight pipe portion (1A) which is to be protected against freezing, and a safety valve (4) downstream of said pipe portion, opening said safety valve (4) at a pressure exceeding by a predetermined value the normal pressure prevailing in said pipe portion, and maintaining said safety valve (4) open for a time at least sufficient to permit the water in said pipe portion (1A) between said non-return valve (3) and said safety valve (4) to leave by said safety valve (4) and be replaced in said pipe portion (1A) by water from said supply of water that has flowed through said non-return valve (3) while said safety valve (4) is open.

2. Water piping system for preventing freezing in a pipe (1, 1A) for conducting water from a supply of water, comprising a pressure-tight non-return valve (3) upstream of an otherwise pressure-tight pipe portion (1A) which is to be protected against freezing, and a safety valve (4) downstream of said pipe portion, said safety valve (4) opening at a pressure exceeding by a predetermined value the normal pressure prevailing in said pipe portion, said safety valve (4) being so constructed as to remain open for a time at least sufficient to permit the water in said pipe portion (1A) between said non-return valve (3) and said safety valve (4) to leave by said safety valve (4) and be replaced in said pipe portion (1A) by water from said supply of water that has flowed through said non-return valve (3) while said safety valve (4) is open.

3. A system as claimed in claim 2, in which said safety valve closes automatically after said time.

4. A water piping system as claimed in claim 2, in which said safety valve (4) comprises a rupturable tab that ruptures to open.

* * * * *